(12) United States Patent
Tang

(10) Patent No.: US 11,711,823 B2
(45) Date of Patent: *Jul. 25, 2023

(54) WIRELESS COMMUNICATION METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/660,962

(22) Filed: Apr. 27, 2022

(65) Prior Publication Data
US 2022/0256515 A1 Aug. 11, 2022

Related U.S. Application Data

(63) Continuation of application No. 16/625,592, filed as application No. PCT/CN2017/096914 on Aug. 10, 2017, now Pat. No. 11,337,198.

(51) Int. Cl.
*H04W 48/12* (2009.01)
*H04W 72/04* (2023.01)
(Continued)

(52) U.S. Cl.
CPC ........... *H04W 72/23* (2023.01); *H04L 5/0053* (2013.01); *H04W 72/0446* (2013.01)

(58) Field of Classification Search
CPC ........... H04W 72/042; H04W 72/0446; H04W 72/1289; H04W 72/23; H04L 5/0053; H04L 5/0094
See application file for complete search history.

(56) References Cited

U.S. PATENT DOCUMENTS

2011/0317610 A1 12/2011 Park
2013/0129008 A1* 5/2013 Ko ................. H04B 7/0456
375/295
(Continued)

FOREIGN PATENT DOCUMENTS

CN 101809898 A 8/2010
CN 102316522 A 1/2012
(Continued)

OTHER PUBLICATIONS

Decision of Rejection of the Korean application No. 10-2020-7000686, dated May 25, 2022. 8 pages with English Translation.
(Continued)

*Primary Examiner* — Diane L Lo
*Assistant Examiner* — Abusayeed M Haque
(74) *Attorney, Agent, or Firm* — Perkins Coie LLP

(57) ABSTRACT

The present application provides a wireless communication method, a network device, and a terminal device. The network device may configure, in a time slot, a time-domain position of a first resource transmitting a physical downlink control channel (PDCCH), so that the terminal device may accurately receive the PDCCH over the first resource, thereby meeting different PDCCH transmission delay requirements. The method comprises: sending first configuration information to a terminal device, the first configuration information indicating a time domain position of a first resource in each of at least one time slot, wherein the first resource is used for transmitting a PDCCH; and sending the PDCCH to the terminal device over the first resource.

20 Claims, 4 Drawing Sheets

300

310, A terminal device receives first configuration information from a network device, where the first configuration information indicates a time-domain position of a first resource in each of at least one slot, and the first resource is used for transmitting a PDCCH 320, The terminal device monitors the PDCCH transmitted by the network device on the first resource

(51) Int. Cl.
*H04W 72/23* (2023.01)
*H04L 5/00* (2006.01)
*H04W 72/0446* (2023.01)

(56) References Cited

U.S. PATENT DOCUMENTS

| | | | | |
|---|---|---|---|---|
| 2014/0036749 | A1* | 2/2014 | Wang | H04W 72/20 370/328 |
| 2015/0282134 | A1 | 10/2015 | Suzuki et al. | |
| 2016/0192326 | A1* | 6/2016 | Park | H04W 4/06 370/312 |
| 2016/0249334 | A1 | 8/2016 | Feng et al. | |
| 2017/0104519 | A1 | 4/2017 | Park et al. | |
| 2017/0111888 | A1 | 4/2017 | Dinan | |
| 2017/0150483 | A1 | 5/2017 | Zhang et al. | |
| 2017/0310431 | A1* | 10/2017 | Iyer | H04L 1/1861 |
| 2018/0049164 | A1 | 2/2018 | Wu et al. | |
| 2018/0064216 | A1 | 3/2018 | Tamaki et al. | |
| 2018/0255534 | A1 | 9/2018 | Wang et al. | |
| 2020/0053759 | A1 | 2/2020 | Parkvall et al. | |
| 2020/0163085 | A1 | 5/2020 | Takeda et al. | |
| 2021/0099896 | A1 | 4/2021 | Dimou et al. | |
| 2021/0105747 | A1 | 4/2021 | Dimou et al. | |
| 2021/0120574 | A1 | 4/2021 | Takeda et al. | |
| 2022/0322418 | A1* | 10/2022 | Kim | H04W 72/1268 |
| 2022/0329364 | A1* | 10/2022 | Lee | H04L 1/1896 |
| 2022/0329366 | A1* | 10/2022 | Kim | H04W 72/23 |
| 2022/0330261 | A1* | 10/2022 | Yeo | H04W 72/56 |

FOREIGN PATENT DOCUMENTS

| | | | | |
|---|---|---|---|---|
| CN | 102368759 | A | 3/2012 | |
| CN | 102740372 | A | 10/2012 | |
| CN | 103200683 | A | 7/2013 | |
| CN | 103220690 | A | 7/2013 | |
| CN | 103404062 | A | 11/2013 | |
| CN | 104519515 | A | 4/2015 | |
| CN | 104769868 | A | 7/2015 | |
| CN | 106535333 | A | 3/2017 | |
| CN | 108476101 | A | 8/2018 | |
| CN | 111165039 | A | 5/2020 | |
| KR | 20180049100 | A | 5/2018 | |
| RU | 2619084 | C2 | 5/2017 | |
| WO | 2012155524 | A1 | 11/2012 | |
| WO | 2014069601 | A1 | 5/2014 | |
| WO | WO-2015079971 | A1 * | 6/2015 | H04J 11/00 |
| WO | WO-2015111323 | A1 * | 7/2015 | H04L 5/001 |
| WO | WO-2015111325 | A1 * | 7/2015 | H04L 5/001 |
| WO | 2017066803 | A1 | 4/2017 | |
| WO | 2017121324 | A1 | 7/2017 | |
| WO | WO-2017173154 | A1 * | 10/2017 | H04B 7/0617 |
| WO | 2019026214 | A1 | 2/2019 | |

OTHER PUBLICATIONS

International Search Report in the international application No. PCT/CN2017/096914, dated Apr. 19, 2018.
NEC. DCI monitoring configuration for mini-slot. 3GPP TSG RAN WG1 Meeting NR Adhoc R1-1700861. Jan. 20, 2017(Jan. 20, 2017), pp. 1 and 2.
Guangdong Oppo Mobile Telecom: "PDCCH CORESET configuration and UE procedure on NR-PDCCH", 3GPP Draft; R1-1707703, 3rd Generation Partnership Project (3GPP), Mobilecompetence Centre; 650, Route Des Luciules; F-06921 Sophia-Antipolis Cedex; France, vol. RAN WG1, No. Hangzhou; 20170515201705196 May 2017 (May 6, 2017), XP051262038, Retrieved from the Internet: URL: http://www.3gpp.org/ftp/tsg_ran/NG1_RL1/TSGR1 89/Docs/[ retrieved on May 6, 2017] * the whole document *.
Guangdong Oppo Mobile Telecom: "Time-domain resource allocation for NR", 3GPP Draft; R1-1710165, 3rd Generation Partnership Project (3GPP), Mobilecompetence Centre; 650, Route Des Luciules; F-06921 Sophia-Antipolis Cedex; France, vol. RAN WG1, No. Qingdao, P.R. China; Jun. 27-30, 2017 Jun. 26, 2017 (Jun. 26, 2017), XP051299389, Retrieved from the Internet: URL: http://www.3gpp.org/ftp/Meetings_3GPP SYNC/RAN1/Docs/[ retrieved on Jun. 26, 2017] * the whole document *.
Supplementary European Search Report in the European application No. 17921161.0, dated Jun. 16, 2020.
Written Opinion of the International Search Authority in the international application No. PCT/CN2017/096914, dated Apr. 19, 2018.
First Office Action of the Russian application No. 2019145323, dated Oct. 1, 2020.
MCC Support, "Final Report of 3GPP TSG RAN WG1 #AH_NR2 v1.0.0" (Qingdao, China, Jun. 27-30, 2017), 3GPP TSG RAN WG1 Meeting #90, R1-1712032, Prague, Czech Rep, Aug. 21-25, 2017.
Huawei et al: "PDCCH monitoring for slot-aggregation and cross-slot scheduling", 3GPP Draft; R1-1711423, 3rd Generation Partnership Project (3GPP), Mobile Competence Centre; 650, Route Des Luciules; F-06921 Sophia-Antipolis Cedex; France, vol. Ran WG1, No. Qingdao, China; Jun. 27-30, 2017 Jun. 26, 2017 (Jun. 26, 2017), XP051300611, Retrieved from the Internet: URL: http://www.3gpp.org/ftp/Meetings_3GPP_Sync/RAN1/Docs/ [retrieved on Jun. 26, 2017].
NTT DOCOMO et al: "Views on control resource set configuration for NR-PDCCH", 3GPP Draft; R1-1711090, 3rd Generation Partnership Project (3GPP), Mobile Competence Centre; 650, Route Des Luciules; F-06921 Sophia-Antipolis Cedex; France, vol. RAN WG1, No. Qingdao, P.R. China; Jun. 27-30, 2017 Jun. 26, 2017 (Jun. 26, 2017), XP051300290, Retrieved from the Internet URL: http://www.3gpp.org/ftp/Meetings_3GPP_Sync/RAN1/Docs/ [retrieved on Jun. 26, 2017].
First Office Action of the European application No. 17921161.0, dated Mar. 22, 2021.
First Office Action of the Chilean application No. 202000038, dated Jan. 20, 2021.
First Office Action of the Canadian application No. 3066664, dated Feb. 16, 2021.
Second Office Action of the Chilean application No. 202000038, dated Apr. 20, 2021.
Office Action of the Indian application No. 201917052963, dated Jun. 30, 2021.
First Office Action of the Chinese application No. 202010072453.0, dated Apr. 22, 2021.
Second Office Action of the Chinese application No. 202010072453.0, dated Jul. 2, 2021.
3GPP TSG RAN WG1 Meeting # AH_NR2 R1-1710106, Qingdao, China, Jun. 26-30, 2017, Source: ZTE, Titie: NR PDCCH Coreset Configuration, Agenda item: 5.1.3.1.2.1, Document for: Discussion and Decision.
3GPP TSG RAN WG1 Meeting #90 R1-1713259, Prague, Czech Republic, Aug. 21-25, 2017, Source: Guangdong OPPO Mobile Telecom, Title: Some remaining issues on Coreset configuration, Agenda Item: 6.1.3.1.2.1, Document for: Discussion and Decision.
First Office Action of the Japanese application No. 2020-500640, dated Jul. 20, 2021.
Second Office Action of the European application No. 17921161.0, dated Sep. 22, 2021.
Written Opinion of the Singaporean application No. 11201912306P, dated Sep. 9, 2021.
Intel Corporation, the R1-1710544, NR PDCCH: Search Spaces and monitoring behavior, 3GPP TSG RAN WG1 #AH, and 3GPP server publication date (Jun. 17, 2017).
HTC, R1-1711272, configuration for control resource sets and search spaces, 3GPP TSG RAN WG1 #AH, 3GPP server publication date (Jun. 16, 2017).
First Office Action of the Korean application No. 10-2020-7000686, dated Nov. 11, 2021.
Second Office Action of the Canadian application No. 3066664, dated Dec. 1, 2021.
Second Office Action of the Japanese application No. 2020-500640, dated Feb. 4, 2022.
First Office Action of the U.S. Appl. No. 16/625,592, dated Aug. 17, 2021.
Notice of Allowance of the U.S. Appl. No. 16/625,592, dated Jan. 19, 2022.

(56) References Cited

OTHER PUBLICATIONS

Corrected Notice of Allowance of the U.S. Appl. No. 16/625,592, dated Feb. 9, 2022.
Corrected Notice of Allowance of the U.S. Appl. No. 16/625,592, dated Feb. 25, 2022.
CATT "Discussion on NR-PDCCH monitoring" 3GPP TSG RAN WG1 Meeting #89 R1-1707496, Hangzhou, P. R. China, May 15-19, 2017. 4 pages.
European Search Report in the European application No. 22186377.2, dated Oct. 21, 2022. 11 pages.
MCC Support "Final Report of 3GPP TSG RAN WG1 #89 v1.0.0 (Hangzhou, China, May 15-19, 2017)" 3GPP TSG RAN WG1 Meeting #90 R1-1712031, Prague, Czech Rep, Aug. 21-25, 2017. 164 pages.
Notice of Allowance of the Korean application No. 10-2020-7000686, dated Sep. 16, 2022. 3 pages with English translation.
First Office Action of the Israeli application No. 271356, dated Aug. 28, 2022. 3 pages.
First Office Action of the Mexican application No. MX/a/2020/000768, dated Mar. 3, 2023. 6 pages with English translation.
NTT Docomo, "Inc, and sPDCCH for shortened TTI" [online], 3 GPP TSG-RAN WG1#86, R1-167368,, the Internet <URL:http://www.3gpp.org/ftp/tsg-ran/WG1_RL1/TSGR1_1373/Docs/R1-167368.zip>, Aug. 13, 2016.
First Office Action of the Japanese application No. 2022-060986, dated May 12, 2023.

\* cited by examiner

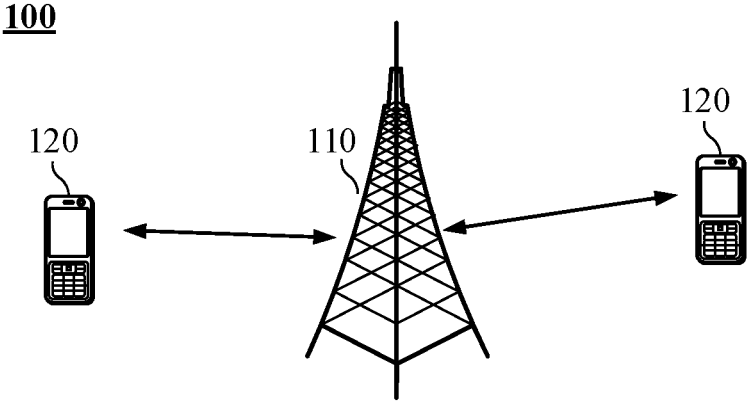
FIG. 1
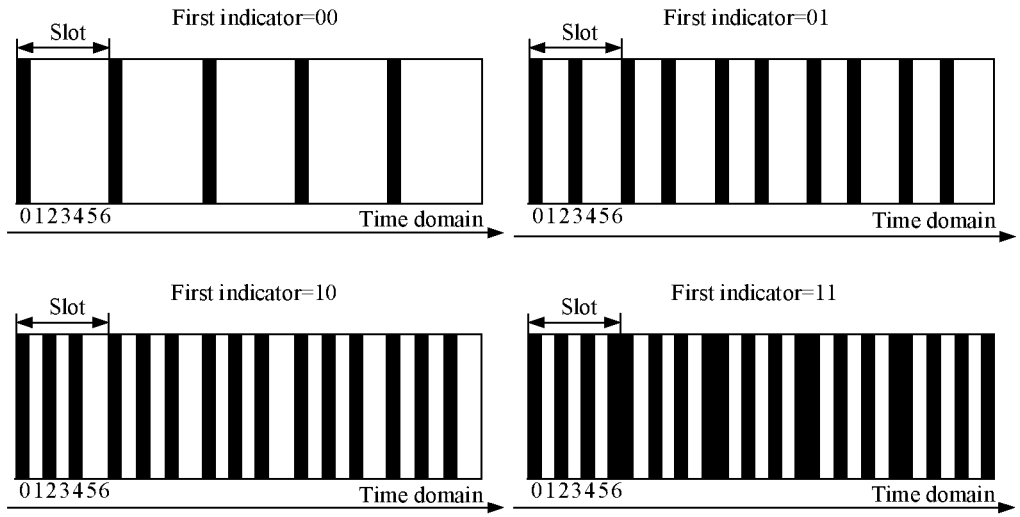
FIG. 2
FIG. 3

WIRELESS COMMUNICATION METHOD, NETWORK DEVICE, AND TERMINAL DEVICE

CROSS-REFERENCES TO RELATED APPLICATIONS

This application is a continuation application of the application Ser. No. 16/625,592, filed Dec. 20, 2019, which is a National Stage Entry of PCT/CN2017/096914, filed Aug. 10, 2017. The entire contents of the above-identified applications are incorporated herein by reference.

TECHNICAL FIELD

The disclosure relates to the field of communications, and more particularly to a method for wireless communication, a network device and a terminal device.

BACKGROUND

In a long term evolution (LTE) system, a terminal device monitors a physical downlink control channel (PDCCH) according to a fixed period, namely monitoring the PDCCH once in each subframe. However, in a new radio (NR) system, for achieving a shorter transmission delay, a higher PDCCH monitoring requirement is made, and monitoring a PDCCH according to a fixed period may not satisfy an increasing requirement on PDCCH monitoring delay. Therefore, how to flexibly configure a PDCCH monitoring manner to satisfy different transmission delay requirements is a problem urgent to be solved.

SUMMARY

The disclosure provides a method for wireless communication, a network device and a terminal device. The network device may configure, in a slot, a time-domain position of a first resource for transmitting a PDCCH, so that the terminal device may accurately receive the PDCCH on the first resource, thereby satisfying different PDCCH transmission delay requirements.

According to a first aspect, the embodiments of the disclosure provide a wireless communication method, which includes the following operations.

First configuration information is transmitted to a terminal device, where the first configuration information indicates a time-domain position of a first resource in each of at least one slot, and the first resource is used for transmitting a PDCCH.

The PDCCH is transmitted to the terminal device on the first resource.

Optionally, the time-domain position, indicated through the first configuration information, in each slot may be a time-domain starting position of the first resource.

Accordingly, in the wireless communication method of the embodiments of the disclosure, a network device configures the time-domain position of the first resource for transmitting the PDCCH in the slot and transmits the PDCCH to the terminal device on the first resource. Therefore, the terminal device may accurately receive the PDCCH on the first resource, thereby satisfying different PDCCH transmission delay requirements.

Optionally, in an implementation of the first aspect, the first configuration information may include a first indicator, and the first indicator may indicate a number N of first resources in each slot, where N≥1.

Optionally, in an implementation of the first aspect, the first configuration information may further include a second indicator, and the second indicator may be configured to indicate time-domain positions of the N first resources in each slot.

Optionally, in an implementation of the first aspect, the first configuration information may include a third indicator, and the third indicator may indicate a set of time-domain positions of all first resources in each slot.

Optionally, in an implementation of the first aspect, time-domain positions of first resources in different time-domain units in a plurality of time-domain units may be the same, and each of the plurality of time-domain units may include the at least one slot.

Optionally, in an implementation of the first aspect, the method may further include the following operation.

Second configuration information is transmitted to the terminal device, where the second configuration information indicates a time-domain position of each of the plurality of the multiple time-domain units.

Optionally, in an implementation of the first aspect, the second configuration information may be one of the following: radio resource control (RRC) signaling, system information, downlink control information (DCI), or a media access control control element (MAC CE).

Optionally, in an implementation of the first aspect, the first configuration information may be one of the following: RRC signaling, system information, DCI, or a MAC CE.

Optionally, in an implementation of the first aspect, the method may further include the following operation.

Third configuration information is transmitted to the terminal device, where the third configuration information indicates a time-domain length of the first resource.

Optionally, in an implementation of the first aspect, the third configuration information may be one of the following: RRC signaling, system information, DCI, or a MAC CE.

Optionally, in an implementation of the first aspect, the first resource may be a control resource set or a search space for transmitting the PDCCH.

According to a second aspect, the embodiments of the disclosure provide a wireless communication method, which includes the following operations.

First configuration information from a network device is received, where the first configuration information indicates a time-domain position of a first resource in each of at least one slot, and the first resource is used for transmitting a PDCCH.

The PDCCH transmitted by the network device is monitored on the first resource.

Optionally, the time-domain position, indicated through the first configuration information, in each slot may be a time-domain starting position of the first resource.

Accordingly, in the wireless communication method of the embodiments of the disclosure, the network device configures the time-domain position of the first resource for transmitting the PDCCH in the slot and transmits the PDCCH to a terminal device on the first resource. Therefore, the terminal device may accurately receive the PDCCH on the first resource, thereby satisfying different PDCCH transmission delay requirements.

Optionally, in an implementation of the second aspect, the first configuration information may include a first indicator, and the first indicator may indicate a number N of first resources in each slot, where N≥1.

Optionally, in an implementation of the second aspect, the first configuration information may further include a second indicator, and the second indicator may indicate time-domain positions of the N first resources in each slot.

Optionally, in an implementation of the second aspect, the first configuration information may include a third indicator, and the third indicator may indicate a set of time-domain positions of all first resources in each slot.

Optionally, in an implementation of the second aspect, time-domain positions of first resources in different time-domain units in a plurality of time-domain units may be the same, and each of the plurality of time-domain units may include the at least one slot.

Optionally, in an implementation of the second aspect, the method may further include the following operations.

Second configuration information from the network device is received, wherein the second configuration information indicates a time-domain position of each of the plurality of multiple time-domain units.

The time-domain position of the first resource is determined based on at least one of the first configuration information or the second configuration information.

Optionally, in an implementation of the second aspect, the second configuration information may be one of the following: RRC signaling, system information, DCI, or a MAC CE.

Optionally, in an implementation of the second aspect, the first configuration information may be one of the following: RRC signaling, system information, DCI, or a MAC CE.

Optionally, in an implementation of the second aspect, the method may further include the following operations.

Third configuration information from the network device is received, where the third configuration information indicates a time-domain length of the first resource.

The time-domain position of the first resource is determined based on the third configuration information and at least one of the first configuration information or the second configuration information.

Optionally, in an implementation of the second aspect, the third configuration information may be one of the following: RRC signaling, system information, DCI, or a MAC CE.

Optionally, in an implementation of the second aspect, the first resource may be a control resource set or a search space for transmitting the PDCCH.

According to a third aspect, the embodiments of the disclosure provide a network device, which may include modules or units executing the method in the first aspect or any optional implementation of the first aspect.

According to a fourth aspect, the embodiments of the disclosure provide a terminal device, which may include modules or units executing the method in the second aspect or any optional implementation of the second aspect.

A fifth aspect provides a network device, which includes a processor, a memory and a communication interface. The processor is connected with the memory and the communication interface. The memory is configured to store instructions, the processor is configured to execute the instructions, and the communication interface is configured for communication with another network element under control of the processor. When the processor executes the instructions stored in the memory, such execution enables the processor to execute the method in the first aspect or any possible implementation of the first aspect.

A sixth aspect provides a terminal device, which includes a processor, a memory and a communication interface. The processor is connected with the memory and the communication interface. The memory is configured to store instructions, the processor is configured to execute the instructions, and the communication interface is configured for communication with another network element under control of the processor. When the processor executes the instructions stored in the memory, such execution enables the processor to execute the method in the second aspect or any possible implementation of the second aspect.

A seventh aspect provides a computer storage medium, in which a program code is stored, the program code including instructions configured to instruct a computer to perform the method in the first aspect or any possible implementation of the first aspect.

An eighth aspect provides a computer storage medium, in which a program code is stored, the program code including instructions configured to instruct a computer to perform the method in the second aspect or any possible implementation of the second aspect.

A ninth aspect provides a computer program product having stored therein instructions that, when executed by a computer, causes the computer to perform the method in each of the above aspects.

BRIEF DESCRIPTION OF DRAWINGS

FIG. 1 illustrates a wireless communication system to which the implementations of the disclosure are applied.

FIG. 2 illustrates a schematic flowchart of a wireless communication method according to an implementation of the disclosure.

FIG. 3 illustrates a schematic diagram of a time-domain position distribution of a first resource according to an implementation of the disclosure.

DETAILED DESCRIPTION

Figure 4:
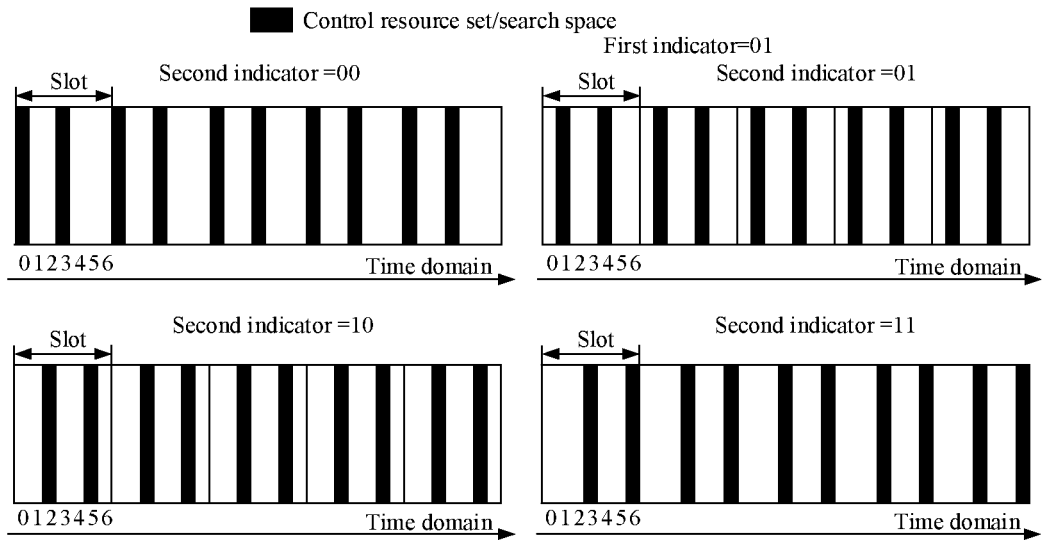
FIG. 4 illustrates a schematic diagram of another time-domain position distribution of a first resource according to an implementation of the disclosure.

The technical solutions in the implementations of the disclosure will be clearly and completely described below in combination with the drawings in the implementations of the disclosure.

The technical solutions of the implementations of the disclosure may be applied to various communication systems, such as a global system of mobile communication (GSM), a code division multiple access (CDMA) system, a wideband code division multiple access (WCDMA) system, a general packet radio service (GPRS), an LTE system, an LTE frequency division duplex (FDD) system, LTE time division duplex (TDD), a universal mobile telecommunication system (UMTS), a worldwide interoperability for microwave access (WiMAX) communication system or a future 5th-generation (5G) system.

FIG. 1 illustrates a wireless communication system 100 to which implementations of the disclosure are applied. The wireless communication system 100 may include a network device 110. The network device 110 may be a device communicating with a terminal device. The network device 110 may provide communication coverage for a particular geographical area and may communicate with a terminal device (for example, user equipment (UE)) located within the coverage area. Optionally, the network device 110 may be a base transceiver station (BTS) in the GSM or the CDMA system, may also be a NodeB (NB) in the WCDMA system, and may further be an evolutional node B (eNB or eNodeB) in the LTE system or a wireless controller in a cloud radio access network (CRAN). Or the network device may be a relay station, an access point, a vehicle-mounted device, a wearable device, a network device in a future 5G network, a network device in a future evolved public land mobile network (PLMN) or the like.

The wireless communication system 100 further includes at least one terminal device 120 under the coverage of the network device 110. The terminal device 120 may be mobile or fixed. Optionally, the terminal device 120 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

Optionally, the terminal device 120 may perform device to device (D2D) communication.

Optionally, the 5G system or network may also be called an NR system or network.

A network device and two terminal devices are exemplarily illustrated in FIG. 1. Optionally, the wireless communication system 100 may include multiple network devices and other numbers of terminal devices may be included in coverage of each network device. There are no limits made thereto in the implementations of the disclosure.

Optionally, the wireless communication system 100 may further include another network entity such as a network controller and a mobility management entity. There are no limits made thereto in the implementations of the disclosure.

In the implementations of the disclosure, the network device may configure, in a slot, a time-domain position of a first resource for transmitting a PDCCH for the terminal device, and the terminal device receives the PDCCH transmitted by the network device at the time-domain position configured by the network device.

Optionally, the first resource may be a control resource set (CORESET) and may also be a search space.

Optionally, the network device configures a first indicator to indicate the number N of first resources in each slot.

Optionally, the network device configures a second indicator to indicate time-domain positions of N first resources in each slot.

Optionally, the network device configures a third indicator to indicate a set of time-domain positions of all first resources in each slot.

Optionally, the network device may further configure a time-domain position of each of a plurality of time-domain units, where each of the plurality of the time-domain units includes at least one slot.

Optionally, the network device may further configure information indicating a time-domain length of the first resource.

Optionally, the control resource set may include a common search resource set and may also include a UE-specific search resource set.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B, and independent existence of B. In addition, character "/" in the disclosure usually represents that previous and next associated objects form an "or" relationship.

FIG. 2 illustrates a schematic flowchart of a wireless communication method 200 according to an implementation of the disclosure. As illustrated in FIG. 2, the method 200 may be executed by a network device. The network device may be the network device illustrated in FIG. 1. A terminal device in the method 200 may be the terminal device illustrated in FIG. 1. The method 200 includes the following operations.

In 210, the network device transmits first configuration information to the terminal device, where the first configuration information indicates a time-domain position of a first resource in each of at least one slot, and the first resource is used for transmitting a PDCCH.

Optionally, the first resource is a control resource set (CORESET) or a search space for transmitting the PDCCH.

Optionally, the first resource may be a common search space, or a UE-specific search space.

Optionally, the time-domain position, indicated through the first configuration information, in each slot may be a time-domain starting position of the first resource.

Optionally, the network device may configure the same time-domain position for the terminal device in each slot through the first configuration information and may also configure a respective time-domain position for the terminal device in each slot through the first configuration information.

Optionally, the first configuration information includes a first indicator, and the first indicator indicates a number N of first resources in each slot, where N≥1.

It is to be understood that, when the network device indicates time-domain positions of the first resources in each of the at least one slot through the first indicator and the number of the first resources is determined, a position of each control resource set in the slot is pre-configured, for example, specified through a protocol.

For example, as illustrated in FIG. 3, the network device indicates the number of the first resources (the control resource set or the search space) in the slot through the first indicator. When the number of the first resources is determined, the position of each first resource in the slot is pre-configured.

Specifically, as illustrated in FIG. 3, the first indicator may include two bits of resources. The two bits of resources are used to indicate the following contents.

When the first indicator is 00, it is indicated that each slot includes one first resource and a starting symbol of the first resource is a zeroth symbol of the slot.

When the first indicator is 01, it is indicated that each slot includes two first resources and starting symbols of the two first resources are the zeroth symbol and third symbol of the slot respectively.

When the first indicator is 10, it is indicated that each slot includes three first resources and starting symbols of the three first resources are the zeroth, second and fourth symbols of the slot respectively.

When the first indicator is 11, it is indicated that each slot includes four first resources and starting symbols of the four first resources are the zeroth, second, fourth and sixth symbols of the slot respectively.

It is also to be understood that, in FIG. 3, the number of the first resources, indicated through the first indicator, is only an example and there are no limits made thereto in the disclosure.

It is also to be understood that, in FIG. 3, the pre-configured position of the starting symbol of each control resource set in the slot is only an example and there are no limits made thereto in the disclosure.

Optionally, the first configuration information further includes a second indicator, and the second indicator indicates time-domain positions of the N first resources in each slot.

It is to be understood that the network device, when configuring the time-domain positions of the first resources in each slot based on the second indicator, is required to know about the number of the first resources in each slot in advance.

Optionally, the first configuration information includes the first indicator and the second indicator. The network device indicates the number of the first resources in each slot through the first indicator and indicates the time-domain positions of the first resources in each slot through the second indicator.

For example, as illustrated in FIG. 4, the network device indicates the number of the first resources (the control resource sets or the search spaces) in one slot through the first indicator. For a certain number of the first resources, the network device indicates the positions of the first resources in the slot through the second indicator.

Specifically, as illustrated in FIG. 4, the first indicator is 01, and the first indicator indicates that each slot includes two first resources. The second indicator includes two bits of resources, and indicates the following contents.

Second indicator is 00 and first configuration information is 0100: it is indicated that starting symbols of the two first resources are zeroth and third symbols of the slot respectively.

Second indicator is 01 and first configuration information is 0101: it is indicated that the starting symbols of the two first resources are first and fourth symbols of the slot respectively.

Second indicator is 10 and first configuration information is 0110: it is indicated that the starting symbols of the two first resources are second and fifth symbols of the slot respectively.

Second indicator is 11 and first configuration information is 0111: it is indicated that the starting symbols of the two first resources are third and sixth symbols of the slot respectively.

It is also to be understood that, in FIG. 4, the number of the first resources, indicated through the first indicator, is only an example and there are no limits made thereto in the disclosure.

It is also to be understood that, in FIG. 4, the positions of the starting symbols of the first resources, indicated through the second indicator, are only examples and there are no limits made thereto in the disclosure.

Optionally, the first configuration information includes a third indicator. The third indicator indicates a set of time-domain positions of all first resources in each slot.

Figure 5:
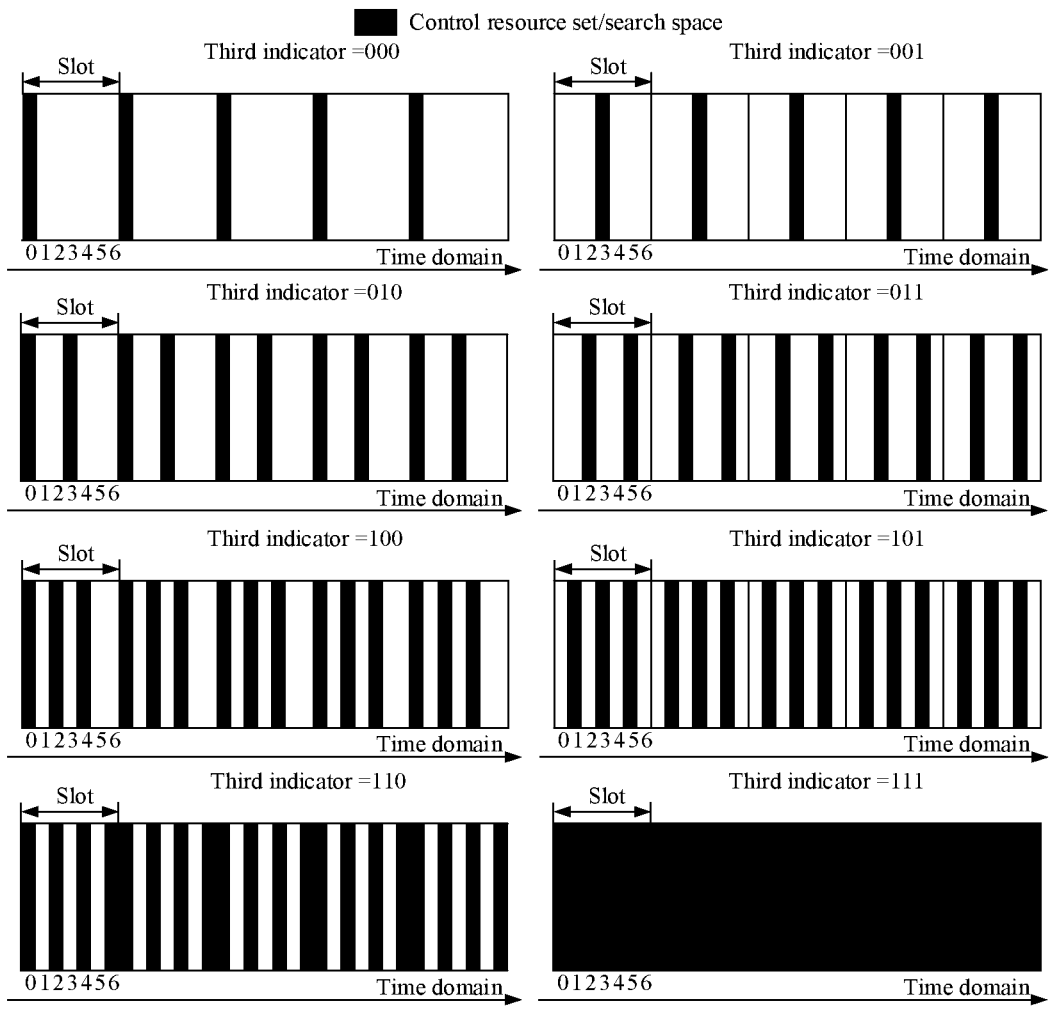
FIG. 5 illustrates a schematic diagram of yet another time-domain position distribution of a first resource according to an implementation of the disclosure.

For example, as illustrated in FIG. 5, the network device indicates the position of the first resource (the control resource set or the search space) in the slot through the third indicator. In this example, the third indicator includes three bits of resources, and indicates the following contents.

Third indicator is 000: it is indicated that each slot includes one first resource and a starting symbol of the first resource is a zeroth symbol of the slot.

Third indicator is 001: it is indicated that each slot includes one first resource and a starting symbol of the first resource is a third symbol of the slot.

Third indicator is 010: it is indicated that each slot includes two first resources and starting symbols of the two first resources are the zeroth and third symbols of the slot respectively.

Third indicator is 011: it is indicated that each slot includes two first resources and starting symbols of the two first resources are second and fifth symbols of the slot respectively.

Third indicator is 100: it is indicated that each slot includes three first resources and starting symbols of the three first resources are the zeroth, second and fourth symbols of the slot respectively.

Third indicator is 101: it is indicated that each slot includes three first resources and starting symbols of the three first resources are first, third and fifth symbols of the slot respectively.

Third indicator is 110: it is indicated that each slot includes four first resources and starting symbols of the four first resources are the zeroth, second, fourth and sixth symbols of the slot respectively.

Third indicator is 111: it is indicated that each slot includes seven first resources and a starting symbol of each of the seven first resources may be one symbol in the slot.

It is also to be understood that, in FIG. 5, the number of the first resources and a position of a starting symbol of each of the corresponding number of the first resources, indicated through the third indicator, are only examples and there are no limits made thereto in the disclosure.

Optionally, the first configuration information is one of the following: RRC signaling, system information, DCI, or a MAC control element (MAC CE).

Optionally, time-domain positions of first resources in different time-domain units in multiple time-domain units are the same, and each of the multiple time-domain units includes the at least one slot.

Figure 6:
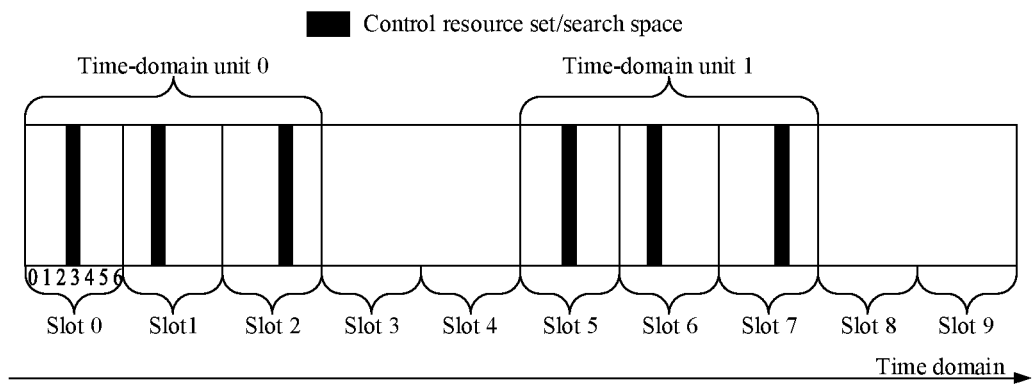
FIG. 6 illustrates a schematic diagram of still another time-domain position distribution of a first resource according to an implementation of the disclosure.

For example, as illustrated in FIG. 6, a time-domain unit 0 includes a slot 0, a slot 1 and a slot 2. A starting symbol of a first resource (control resource set or search space) in the slot 0 is a third symbol of the slot 0, a starting symbol of a first resource in the slot 1 is a second symbol of the slot 1, and a starting symbol of a first resource in the slot 2 is a fourth symbol of the slot 2. A time-domain unit 1 includes a slot 5, a slot 6 and a slot7. A starting symbol of a first resource in the slot 5 is a third symbol of the slot 5, a starting symbol of a first resource in the slot 6 is a second symbol of the slot 6, and a starting symbol of a first resource in the slot 7 is a fourth symbol of the slot 7.

Optionally, the method 200 further includes the following operation.

The network device transmits second configuration information to the terminal device, where the second configuration information indicates a time-domain position of each of the multiple time-domain units.

For example, as illustrated in FIG. 6, the second configuration information may indicate that a time-domain position of the time-domain unit 0 is the slot 0 to the slot 2 and a time-domain position of the time-domain unit 1 is the slot 5 to the slot 7.

It is to be understood that the time-domain position of the time-domain unit, indicated through the second configuration information in FIG. 6, is only an example and there are no limits made thereto in the disclosure.

Optionally, the second configuration information is one of the following: RRC signaling, system information, DCI, or a MAC CE.

Optionally, the method 200 further includes the following operation.

The network device transmits third configuration information to the terminal device, where the third configuration information indicates a time-domain length of the first resource.

It is to be understood that, when the position of the starting symbol of the first resource and the time-domain length of the first resource are obtained, all time-domain information of the first resource may be determined.

Optionally, the third configuration information is one of the following: RRC signaling, system information, DCI, or a MAC CE.

In 220, the network device transmits the PDCCH to the terminal device on the first resource.

Accordingly, in the wireless communication method of the implementation of the disclosure, the network device configures the time-domain position of the first resource for transmitting the PDCCH in the slot and transmits the PDCCH to the terminal device on the first resource. Therefore, the terminal device may accurately receive the PDCCH on the first resource, therefore satisfying different PDCCH transmission delay requirements.

Furthermore, the network device may indicate the time-domain position of the first resource in the slot through the first configuration information, may indicate position information of the multiple time-domain units through the second configuration information and may further indicate the time-domain length of the first resource through the third configuration information.

Figure 7:
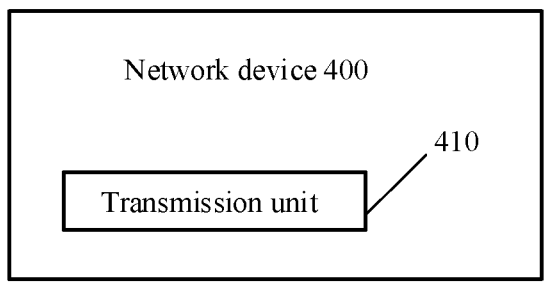
FIG. 7 illustrates a schematic flowchart of another wireless communication method according to an implementation of the disclosure.

FIG. 7 illustrates a schematic flowchart of a wireless communication method 300 according to an implementation of the disclosure. As illustrated in FIG. 7, the method 300 may be executed by a terminal device. The terminal device may be the terminal device illustrated in FIG. 1. A network device in the method 300 may be the network device illustrated in FIG. 1. The method 300 includes the following operations.

In 310, the terminal device receives first configuration information from the network device, where the first configuration information indicates a time-domain position of a first resource in each of at least one slot and the first resource is used for transmitting a PDCCH.

Optionally, the first resource is a control resource set or a search space for transmitting the PDCCH.

Optionally, the first configuration information includes a first indicator, and the first indicator indicates the number N of the first resources in each slot, where N≥1.

Optionally, the first configuration information further includes a second indicator, and the second indicator indicates time-domain positions of the N first resources in each slot.

Optionally, the first configuration information includes a third indicator, and the third indicator indicates a set of time-domain positions of all first resources in each slot.

Optionally, the first configuration information is one of the following: RRC signaling, system information, DCI, or a MAC CE.

Optionally, time-domain positions of the first resources in different time-domain units in multiple time-domain units are the same, and each of the multiple time-domain units includes the at least one slot.

Optionally, the method 300 further includes the following operations.

The terminal device receives second configuration information from the network device, where the second configuration information indicates a time-domain position of each of the multiple time-domain units.

The terminal device determines the time-domain position of the first resource based on at least one of the first configuration information or the second configuration information.

Optionally, the second configuration information is one of the following: RRC signaling, system information, DCI, or a MAC CE.

Optionally, the method 300 further includes the following operations.

The terminal device receives third configuration information from the network device, where the third configuration information indicates a time-domain length of the first resource.

The terminal device determines the time-domain position of the first resource based on the third configuration information and at least one of the first configuration information or the second configuration information.

Optionally, the third configuration information is one of the following: RRC signaling, system information, DCI, or a MAC CE.

In 320, the terminal device monitors the PDCCH transmitted by the network device on the first resource.

It is to be understood that the operations in the wireless communication method 300 may refer to the descriptions about the corresponding operations in the wireless communication method 200 and, for simplicity, will not be elaborated herein.

Accordingly, in the wireless communication method of the implementation of the disclosure, the network device configures the time-domain position of the first resource for transmitting the PDCCH in the slot and transmits the PDCCH to the terminal device on the first resource. Therefore, the terminal device may accurately receive the PDCCH on the first resource, thereby satisfying different PDCCH transmission delay requirements.

Furthermore, the network device may indicate the time-domain position of the first resource in the slot through the first configuration information, may indicate position information of the multiple time-domain units through the second configuration information and may further indicate the time-domain length of the first resource through the third configuration information.

Figure 8:
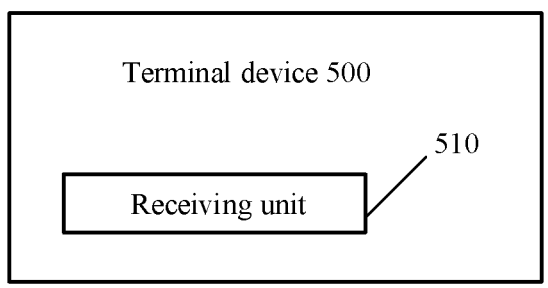
FIG. 8 illustrates a schematic block diagram of a network device according to an implementation of the disclosure.

FIG. 8 illustrates a schematic block diagram of a network device 400 according to an implementation of the disclosure. As illustrated in FIG. 8, the network device 400 includes a transmission unit 410.

The transmission unit 410 is configured to transmit first configuration information to a terminal device, where the first configuration information indicates a time-domain position of a first resource in each of at least one slot, and the first resource is used for transmitting a PDCCH.

The transmission unit 410 is further configured to transmit the PDCCH to the terminal device on the first resource.

Optionally, the first configuration information includes a first indicator, and the first indicator indicates a number N of first resources in each slot, where N≥1.

Optionally, the first configuration information further includes a second indicator, and the second indicator indicates time-domain positions of the N first resources in each slot.

Optionally, the first configuration information includes a third indicator, and the third indicator indicates a set of time-domain positions of all the first resources in each slot.

Optionally, time-domain positions of the first resources in different time-domain units in multiple time-domain units are the same, and each of the multiple time-domain units includes the at least one slot.

Optionally, the transmission unit 410 is further configured to transmit second configuration information to the terminal device, where the second configuration information indicates a time-domain position of each of the multiple time-domain units.

Optionally, the second configuration information is one of the following: RRC signaling, system information, DCI, or a MAC CE.

Optionally, the first configuration information is one of the following: RRC signaling, system information, DCI, or a MAC CE.

Optionally, the transmission unit 410 is further configured to transmit third configuration information to the terminal device, where the third configuration information indicates a time-domain length of the first resource.

Optionally, the third configuration information is one of the following: RRC signaling, system information, DCI, or a MAC CE.

Optionally, the first resource is a control resource set or a search space for transmitting the PDCCH.

It is to be understood that the network device 400 according to the implementation of the disclosure may correspond to the network device in the method implementation of the disclosure and the abovementioned and other operations and/or functions of each unit in the network device 400 are adopted to implement the corresponding flows executed by the network device in the method 200 illustrated in FIG. 2 respectively and will not be elaborated herein for simplicity.

Figure 9:
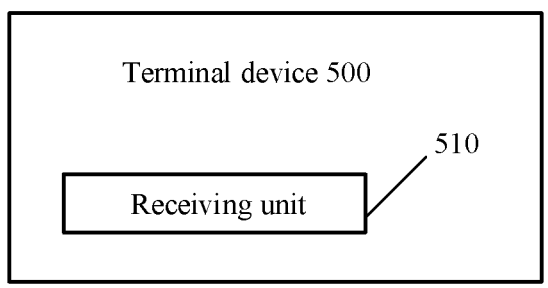
FIG. 9 illustrates a schematic block diagram of a terminal device according to an implementation of the disclosure.

FIG. 9 illustrates a schematic block diagram of a terminal device 500 according to an implementation of the disclosure. As illustrated in FIG. 9, the terminal device 500 includes a receiving unit 510.

The receiving unit 510 is configured to receive first configuration information from a network device, where the first configuration information indicates a time-domain position of a first resource in each of at least one slot, and the first resource is used for transmitting a PDCCH.

The receiving unit 510 is further configured to monitor the PDCCH transmitted by the network device on the first resource.

Optionally, the first configuration information includes a first indicator, and the first indicator indicates a number N of first resources in each slot, where N≥1.

Optionally, the first configuration information further includes a second indicator, and the second indicator indicates time-domain positions of the N first resources in each slot.

Optionally, the first configuration information includes a third indicator, and the third indicator indicates a set of time-domain positions of all the first resources in each slot.

Optionally, time-domain positions of the first resources in different time-domain units in multiple time-domain units are the same, and each of the multiple time-domain units includes the at least one slot.

Optionally, the terminal device includes the receiving unit 510 and a processing unit 520.

The receiving unit 510 is further configured to receive second configuration information from the network device, where the second configuration information indicates a time-domain position of each of the multiple time-domain units.

The processing unit 520 is configured to determine the time-domain position of the first resource based on at least one of the first configuration information or the second configuration information.

Optionally, the second configuration information is one of the following: RRC signaling, system information, DCI, or a MAC CE.

Optionally, the first configuration information is one of the following: RRC signaling, system information, DCI, or a MAC CE.

Optionally, the terminal device includes the receiving unit 510 and the processing unit 520.

The receiving unit 510 is further configured to receive third configuration information from the network device, where the third configuration information indicates a time-domain length of the first resource.

The processing unit 520 is configured to determine the time-domain position of the first resource based on the third configuration information and at least one of the first configuration information or the second configuration information.

Optionally, the third configuration information is one of the following: RRC signaling, system information, DCI, or a MAC CE.

Optionally, the first resource is a control resource set or a search space for transmitting the PDCCH.

It is to be understood that the terminal device 500 according to the implementation of the disclosure may correspond to the terminal device in the method implementation of the disclosure and the abovementioned and other operations and/or functions of each unit in the terminal device 500 are adopted to implement the corresponding flows executed by the terminal device in the method 300 illustrated in FIG. 7 respectively and will not be elaborated herein for simplicity.

Figure 10:
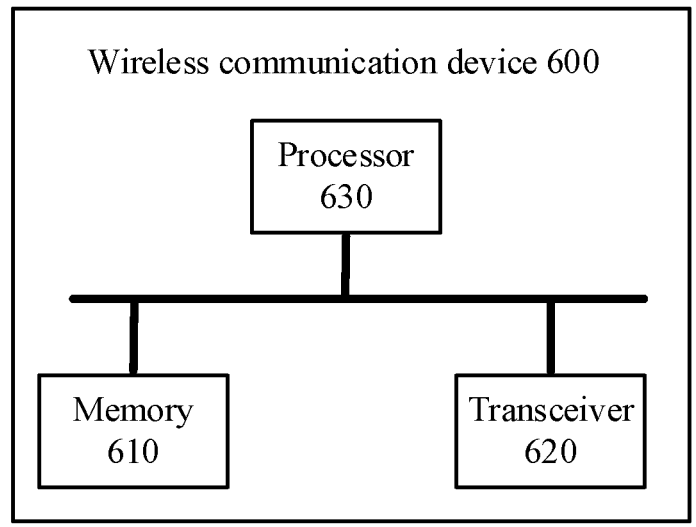
FIG. 10 illustrates a schematic block diagram of a wireless communication device according to an implementation of the disclosure.

FIG. 10 illustrates a schematic block diagram of a wireless communication device 600 according to an implementation of the disclosure. The device 600 includes a memory 610, a transceiver 620 and a processor 630.

The memory 610 is configured to store a program, where the program includes a code.

The transceiver 620 is configured to communicate with another device.

The processor 630 is configured to execute the program code in the memory 610.

Optionally, when the code is executed, the processor 630 may implement each operation executed by a network device in the method 200 in FIG. 2. For simplicity, no more elaborations will be made herein. In such a case, the device 600 may be an access network device and may also be a core network device. The transceiver 620 is configured to execute signal transmission and reception under driving of the processor 630.

Optionally, when the code is executed, the processor 630 may further implement each operation executed by the terminal device in the method 300 in FIG. 7. For simplicity, no more elaborations will be made herein. In such a case, the device 600 may be a terminal device, for example, a mobile phone.

It is to be understood that, in the implementation of the disclosure, the processor 630 may be a central processing unit (CPU) and the processor 630 may also be another universal processor, a digital signal processor (DSP), an application specific integrated circuit (ASIC), an field-programmable gate array (FPGA) or another programmable logic device, discrete gate or transistor logic device and discrete hardware component and the like. The universal processor may be a microprocessor or the processor may also be any conventional processor and the like.

The memory 610 may include a read-only memory (ROM) and a random access memory (RAM) and provides instructions and data for the processor 630. A part of the memory 610 may further include a nonvolatile RAM. For example, the memory 610 may further store information of a device type.

The transceiver 620 may be configured to realize functions of signal transmission and reception, for example, frequency modulation and demodulation functions or up-conversion and down-conversion functions.

In an implementation process, at least one operation of the method may be implemented through a hardware in the processor 630, such as an integrated logical circuit. Or the integrated logical circuit may implement the at least one operation under driving of instructions in a software form. Therefore, the wireless communication device 600 may be a chip or a chip set. The operations of the method disclosed in combination with the implementations of the disclosure may be directly embodied to be executed and completed by a hardware processor or executed and completed by a combination of hardware and software modules in the processor. The software module may be located in a storage medium known in the art such as a RAM, a flash memory, a ROM, a programmable ROM or electrically erasable programmable ROM and a register. The storage medium is located in the memory. The processor 630 reads information from the memory, and implements the operations of the methods in combination with hardware. No more detailed descriptions will be made herein to avoid repetitions.

Figure 11:
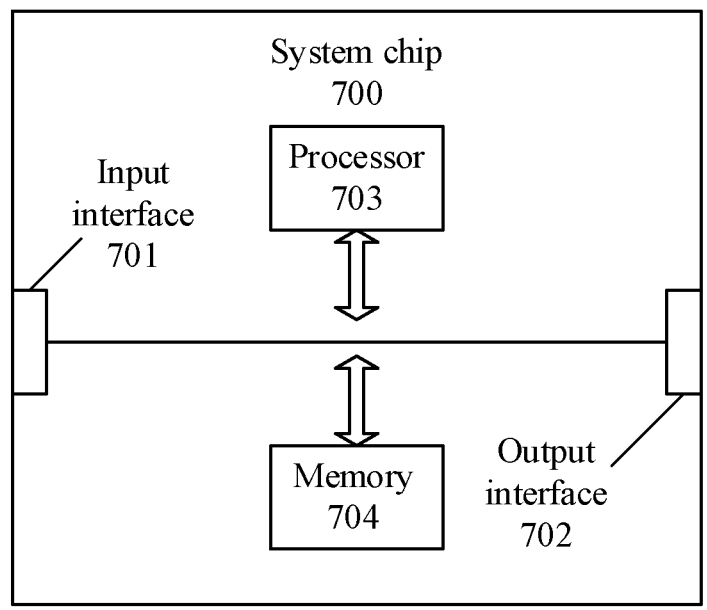
FIG. 11 illustrates a schematic structure diagram of a system chip according to an implementation of the disclosure.

FIG. 11 illustrates a schematic structure diagram of a system chip 700 according to an implementation of the disclosure. The system chip 700 of FIG. 11 includes an input interface 701, an output interface 702, a processor 703 and a memory 704. The input interface 701, the output interface 702, the processor 703 and the memory 704 may be connected through internal communication connecting lines. The processor 703 is configured to execute a code in the memory 704.

Optionally, when the code is executed, the processor 703 implements methods executed by a network device in the method implementations. For simplicity, no more elaborations will be made herein.

Optionally, when the code is executed, the processor 703 implements methods executed by a terminal device in the method implementations. For simplicity, no more elaborations will be made herein.

Those of ordinary skill in the art may realize that the units and algorithm operations of each example described in combination with the implementations disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method implementation and will not be elaborated herein for convenient and brief description.

In some implementations provided by the disclosure, it is to be understood that the disclosed system, device and method may be implemented in another manner. For example, the device implementation described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the implementations according to a practical requirement.

In addition, each functional unit in each implementation of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each implementation of the disclosure. The storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for wireless communication, comprising:
   receiving first configuration information from a network device, wherein the first configuration information indicates a time-domain position of a first resource in each of at least one slot;
   receiving third configuration information from the network device, wherein the third configuration information indicates a time-domain length of the first resource;

determining the time-domain position of the first resource based on the third configuration information and the first configuration information; and monitoring a physical downlink control channel (PDCCH) transmitted by the network device on the first resource.

2. The method of claim 1, further comprising:

receiving second configuration information from the network device, wherein the second configuration information indicates a time-domain position of each of a plurality of time-domain units, and each of the plurality of time-domain units comprises the at least one slot; and determining the time-domain position of the first resource based on the first configuration information and the second configuration information.

3. The method of claim 2, wherein time-domain positions of first resources in different time-domain units in the plurality of time-domain units are the same.

4. A method for wireless communication, comprising:

transmitting first configuration information to a terminal device, wherein the first configuration information indicates a time-domain position of a first resource in each of at least one slot, and the first resource is used for transmitting a physical downlink control channel (PDCCH); and transmitting third configuration information to the terminal device, wherein the third configuration information indicates a time-domain length of the first resource, wherein the first configuration information and the third configuration information are used for the terminal device to determine the time-domain position of the first resource.

5. The method of claim 4, further comprising:

transmitting second configuration information to the terminal device, wherein the second configuration information indicates a time-domain position of each of a plurality of time-domain units, and each of the plurality of time-domain units comprises the at least one slot, so that the terminal device determines the time-domain position of the first resource based on the first configuration information and the second configuration information.

6. The method of claim 5, wherein time-domain positions of first resources in different time-domain units in the plurality of time-domain units are the same.

7. The method of claim 5, wherein the second configuration information is one of the following: radio resource control (RRC) signaling, system information, downlink control information (DCI), or a media access control control element (MAC CE).

8. The method of claim 4, wherein the first configuration information comprises a third indicator, and the third indicator indicates a set of time-domain positions of all first resources in each slot.

9. The method of claim 4, wherein the first configuration information is one of the following: RRC signaling, system information, DCI, or a MAC CE.

10. The method of claim 4, wherein the third configuration information is one of the following: RRC signaling, system information, DCI, or a MAC CE.

11. The method of claim 4, wherein the first resource is a control resource set or a search space for transmitting the PDCCH.

12. A network device implementing the method for wireless communication of claim 4, comprising:

a processor; and memory, configured to store instructions executable by the processor, wherein the processor is configured to execute the instructions stored in the memory to perform steps of the method.

13. A terminal device, comprising:

a processor; and a memory storing computer readable instructions executable by the processor, wherein the processor is configured to:

receive, through a transceiver, first configuration information from a network device, wherein the first configuration information indicates a time-domain position of a first resource in each of at least one slot;

receive, through the transceiver, third configuration information from the network device, wherein the third configuration information indicates a time-domain length of the first resource;

determine the time-domain position of the first resource based on the third configuration information and the first configuration information; and monitor a physical downlink control channel (PDCCH) transmitted by the network device on the first resource.

14. The terminal device of claim 13, wherein the processor is further configured to:

receive, through the transceiver, second configuration information from the network device, wherein the second configuration information indicates a time-domain position of each of a plurality of time-domain units, and each of the plurality of time-domain units comprises the at least one slot; and determine the time-domain position of the first resource based on the first configuration information and the second configuration information.

15. The terminal device of claim 14, wherein time-domain positions of first resources in different time-domain units in the plurality of time-domain units are the same.

16. The terminal device of claim 14, wherein the second configuration information is one of the following: radio resource control (RRC) signaling, system information, downlink control information (DCI), or a media access control control element (MAC CE).

17. The terminal device of claim 13, wherein the first configuration information comprises a third indicator, and the third indicator indicates a set of time-domain positions of all first resources in each slot.

18. The terminal device of claim 13, wherein the first configuration information is one of the following: RRC signaling, system information, DCI, or a MAC CE.

19. The terminal device of claim 13, wherein the third configuration information is one of the following: RRC signaling, system information, DCI, or a MAC CE.

20. The terminal device of claim 13, wherein the first resource is a control resource set or a search space for transmitting the PDCCH.

* * * * *